United States Patent
Weiss

(10) Patent No.: US 10,776,252 B1
(45) Date of Patent: Sep. 15, 2020

(54) CROWD-SOURCED AUTOMATIC GENERATION OF USER INTERFACE TESTS FOR ENTERPRISE-SPECIFIC MOBILE APPLICATIONS

(71) Applicant: WALGREEN CO., Deerfield, IL (US)

(72) Inventor: Benjamin Weiss, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 25 days.

(21) Appl. No.: 16/201,802

(22) Filed: Nov. 27, 2018

(51) Int. Cl.
*G06F 11/36* (2006.01)

(52) U.S. Cl.
CPC ...... *G06F 11/3684* (2013.01); *G06F 11/3612* (2013.01); *G06F 11/3664* (2013.01)

(58) Field of Classification Search
CPC ............. G06F 11/3684; G06F 11/3612; G06F 11/3664
See application file for complete search history.

(56) References Cited

U.S. PATENT DOCUMENTS

| | | | | |
|---|---|---|---|---|
| 6,622,298 B1 * | 9/2003 | Stamm | | G06F 11/3684 717/125 |
| 7,742,591 B2 * | 6/2010 | Paek | | H04M 3/527 379/265.01 |
| 8,150,674 B2 * | 4/2012 | Anand | | G06F 11/3692 703/22 |
| 8,312,322 B2 * | 11/2012 | Gururaj | | G06F 11/0766 714/25 |
| 8,856,748 B1 * | 10/2014 | Larsen | | G06F 11/3668 717/125 |
| 8,909,202 B2 | 12/2014 | Luna et al. | | |
| 9,141,509 B2 * | 9/2015 | Kutchuk | | G06F 11/3438 |
| 9,531,745 B1 * | 12/2016 | Sharma | | G06F 21/563 |

(Continued)

FOREIGN PATENT DOCUMENTS

| | | | | |
|---|---|---|---|---|
| CN | 102244594 B | * | 1/2016 | ............. H04L 43/50 |
| CN | 103646197 B | * | 6/2016 | |

OTHER PUBLICATIONS

Mao et al., "Crowd Intelligence Enhances Automated Mobile Testing", 2017, IEEE (Year: 2017).*

(Continued)

*Primary Examiner* — Wei Y Zhen
*Assistant Examiner* — Junchun Wu
(74) *Attorney, Agent, or Firm* — Marshall, Gerstein & Borun LLP; Randall G. Rueth

(57) ABSTRACT

A computer-implemented method includes downloading respective instances of an enterprise mobile application to a plurality of mobile devices. The instances of the enterprise mobile applications, while executing on respective mobile devices, capture, for each session, a session log that includes indications of ordered user actions occurring during the session, and optionally time intervals between user actions and/or user attributes. Captured session logs stored at and are mined by one or more servers to discover a particular pattern or sequence of user actions that occurred across multiple, different user sessions. If the number and/or rate of occurrences of the particular pattern is greater than a threshold, a new test case corresponding to the pattern is automatically generated and added to a suite of test cases for the UI functionality of the enterprise mobile application. The updated test suite may be automatically executed on a test version of the enterprise mobile application.

18 Claims, 3 Drawing Sheets

(56) References Cited

U.S. PATENT DOCUMENTS

| | | | | |
|---|---|---|---|---|
| 9,747,191 | B1* | 8/2017 | Marolia | G06F 11/3664 |
| 2005/0097364 | A1* | 5/2005 | Edeki | G06F 21/552 |
| | | | | 726/4 |
| 2009/0183143 | A1* | 7/2009 | Li | G06F 11/3414 |
| | | | | 717/126 |
| 2011/0209159 | A1* | 8/2011 | Baratz | G06F 16/24575 |
| | | | | 718/108 |
| 2013/0311976 | A1* | 11/2013 | Bhat | G06F 11/3676 |
| | | | | 717/130 |
| 2014/0109058 | A1* | 4/2014 | Tempel | G06F 11/3664 |
| | | | | 717/125 |
| 2014/0109061 | A1* | 4/2014 | Gibbens | G06F 11/3688 |
| | | | | 717/126 |
| 2015/0052503 | A1* | 2/2015 | Ligman | G06F 11/3664 |
| | | | | 717/125 |
| 2015/0370687 | A1* | 12/2015 | Stein | G06F 11/3684 |
| | | | | 717/124 |
| 2016/0011960 | A1* | 1/2016 | Krishna | G06F 8/70 |
| | | | | 717/135 |
| 2016/0196305 | A1* | 7/2016 | Liu | G06F 16/9535 |
| | | | | 707/692 |
| 2018/0004626 | A1* | 1/2018 | Kishishita | G06F 11/0775 |
| 2018/0121337 | A1* | 5/2018 | Unsal | G06F 11/3684 |

OTHER PUBLICATIONS

Bao et al., "Insensitivity of User Distribution in Multicell Networks under General Mobility and Session Patterns", Dec. 2013, IEEE, vol. 12, No. 12 (Year: 2013).*

Elbaum et al., "Leveraging User-Session Data to Support Web Application Testing", Mar. 2005, IEEE, vol. 31, No. 3 (Year: 2005).*

Tseng et al., "Mining Multilevel and Location-Aware Service Patterns in Mobile Web Environments", Dec. 2004, IEEE, vol. 34, No. 6 (Year: 2004).*

Zhong, "The research and application of web log mining based on the platform weka", 2011, Elsevier (Year: 2011).*

Yang et al., "Web-log Mining for Quantitative Temporal-Event Prediction", Dec. 2002, IEEE, vol. 1 No. 1 (Year: 2002).*

Elson, Sarah, Product Growth at www.lambdatest.com Feb. 2018, "Machine Learning for Automation Testing." Retrieved from the Internet on Sep. 17, 2018. https://medium.com/@sarahelson81/machine-learning-for-automation-testing-698230917082.

Hu, et al., "Automating GUI Testing for Android Applications," Department of Computer Science and Engineering, University of California, Riverside, CA, *Proceedings of the 6th International Workshop on Automation of Software Test*, AST '11, pp. 77-83, New York, NY, USA 2011. ACM.

Wang et al., "Automatic Generation of System Test Cases from Use Case Specifications." ISSTA 2015 Proceedings of the 2015 International Symposium on Software Testing and Analysis. Retrieved from the Internet on Jul. 2015. https://dl.acm.org/citation.cfm?id=2771812 Bibliographic info and abstract attached.

Hu et al., "DroidWalker: Generating Reproducible Test Cases via Automatic Exploration of Android Apps." Key Laboratory of High Confidence Software Technologies (Peking University), Ministry of Education, Peking, China, Oct. 24, 2017.

Rodriguez, "Automatic Generation of GUI Test Cases using and Colony Optimization and Greedy Algorithm." Glen & Rodríguez, José. (2015). Automatic generation of GUI test cases using Ant Colony Optimization and Greedy algorithm. CIBSE 2015—XVIII Ibero-American Conference on Software Engineering.

* cited by examiner

CROWD-SOURCED AUTOMATIC GENERATION OF USER INTERFACE TESTS FOR ENTERPRISE-SPECIFIC MOBILE APPLICATIONS

FIELD OF THE DISCLOSURE

The present disclosure generally relates to automatically generating test cases of user interface (UI) functionality for an enterprise's mobile application via crowd-sourced data.

BACKGROUND

Enterprises, such as retailers, have hundreds, if not thousands of actions that users may perform via the user interface of the enterprise's applications executing on the users' mobile devices. For example, for a retailer that sells products as well as provides pharmacy services, re-filling a prescription is just one of many different actions or tasks that a user can perform via the enterprise's mobile application. For instance, a user may also update their notification preferences, update their name or other user profile information, clip coupons, check inventory for 70,000+ products, add products to a shopping cart, read millions of reviews, etc. Ensuring that all of these types of user experiences execute as desired and/or as defined via the user interface of an enterprise's mobile application and ensuring that particular user actions do not break or negatively impact other functionality of the mobile application is no small task, as thousands of test cases may be needed to sufficiently test the user interface of an enterprise's mobile application. For example, a test version of the enterprise's mobile application may be executed (e.g., on a physical mobile device and/or via a virtual machine), and a sequence of user actions specified in a test case may be automatically performed on the executing test of the mobile application, e.g., "tap on 'Pharmacy' user control, then wait 3 seconds, then tap on 'Refill from Account' user control, then enter {userID} in the input field called "username . . . ," and so on. Each user interface test case is designed to ensure that a particular piece of functionality is working as intended and/or that certain sequences of user actions do not negatively impact other functionality of the mobile application.

Writing test cases is time consuming and difficult, and ensuring that a test case is written in a way that reflects how a user would actually navigate an enterprise's mobile application in the real world is even more difficult.

Currently known techniques for automatic generation of user interface test cases include training a machine learning model by using crowd-sourced data, e.g., by using user interface action and sequencing data that has been obtained from "a crowd" of mobile applications executing at mobile devices, and then utilizing the trained model to generate unit test cases. However, as such techniques use classifying and other statistical, aggregate data analysis techniques to generate the new test cases, the accuracy of at least some of such test cases with respect to the actions that real-world users actually perform may be inaccurate, as such test cases are synthetic, i.e., such test cases are new test cases that have been generated by the model. For example, when various types of inputs are omitted from or not indicated within the training data (e.g., geographic location, user demographic, etc.), the impact of such inputs may accurately reflect real-world behavior in test cases generated by the model. Further, modeling techniques may generate, in theory, an infinite number of test cases, making it difficult to ascertain which are the most useful test cases that correspond to actual, real-world user actions as, in practice, the amount of resources an enterprise has available for testing mobile applications (e.g., computer processing resources, human resources, time, money, etc.) is limited, and the enterprise would want to perform only the test cases that have the most impact on the quality of their mobile application user interface given their limited resources. Similar drawbacks also pertain to automated test generation techniques that utilize models that are created using techniques other than training models, e.g., natural language processing, finite state machine generation, class diagrams and constraints, a priori defined specifications, etc.

Other currently known automated test generation techniques include utilizing randomly generated sequences of user inputs for test cases, utilizing combinatorial testing techniques on sequences of user inputs and/or domains of user inputs, generating UI graphs and traversing paths therein, automatically generating test cases from exploring the various branches of a mobile application's source code, and the like. However, such techniques also suffer from accurately representing actual, real-world user actions, and/or from being able to ascertain the most useful and beneficial test cases.

SUMMARY

The novel methods, systems, and techniques disclosed herein may address at least the above-discussed drawbacks of currently known techniques for automated test generation for mobile application user interfaces. For example, the novel methods, systems, and techniques disclosed herein may automatically generate test cases that are more accurate in their representation of actual, real-world user actions, as well as may help to better identify the most useful test cases across a suite of test cases.

In one aspect, a method of automatic test generation includes downloading, e.g., from one or more servers, a respective instance of a mobile application to each of a plurality of mobile devices. The mobile application is configured to capture a respective session log for each user session of the mobile application, and the respective session log includes one or more indications of ordered user actions that occurred during the each user session (and optionally, of time intervals elapsing between each of the ordered user actions, and/or user attributes). The method further includes obtaining a plurality of session logs generated by the plurality of instances of the mobile application executing at the plurality of mobile devices; storing the plurality of session logs in one or more non-transitory data storage devices accessible to the one or more servers; and discovering, by mining the plurality of session logs, a particular pattern of a sequence of user actions that is included in more than one session log. Additionally, the method includes determining that a number and/or a rate of occurrences of the particular pattern within the plurality of session logs is greater than a threshold; and based upon the determination, automatically generating a new test case based on the particular pattern. Further, the method includes automatically adding the new test case to a suite of test cases that is used to test user interface functionality of the mobile application.

In another aspect, one or more servers include (i) one or more processors, and (ii) one or more non-transitory memories storing instructions that, when executed by the one or more processors, cause the one or more servers to: download a respective instance of a mobile application to each of a plurality of mobile devices. The mobile application may be configured to capture a respective session log for each user session of the mobile application, and the respective session log may include one or more indications of ordered user actions that occurred during the each user session. The one or more servers are further caused to: obtain a plurality of session logs generated by the plurality of instances of the mobile application executing at the plurality of mobile devices, and store the plurality of the session logs at the one or more servers; discover, by mining the plurality of session logs, a particular pattern of a sequence of user actions (and optionally, of time intervals elapsing between each of the ordered user actions, and/or user attributes) that is included in more than one session log; and determine that a number and/or a rate of occurrences of the particular pattern within the plurality of session logs is greater than a threshold. Based upon the determination, the one or more servers are caused to automatically generate a new test case based on the particular pattern, and automatically add the new test case to a suite of test cases that is used to test user interface functionality of the mobile application.

BRIEF DESCRIPTION OF THE DRAWINGS

The figures described below depict various aspects of the system and methods disclosed herein for purposes of illustration only. It should be understood that each figure depicts an embodiment of one or more particular aspects of the disclosed system and methods, and that each of the figures is intended to accord with a possible embodiment thereof. One skilled in the art will readily recognize from the following discussion that alternative embodiments of the systems and methods illustrated herein may be employed without departing from the principles of the invention described herein. Further, wherever possible, the following description refers to the reference numerals included in the following figures, in which features depicted in multiple figures are designated with consistent reference numerals.

DETAILED DESCRIPTION

I. Overview

Figure 1:
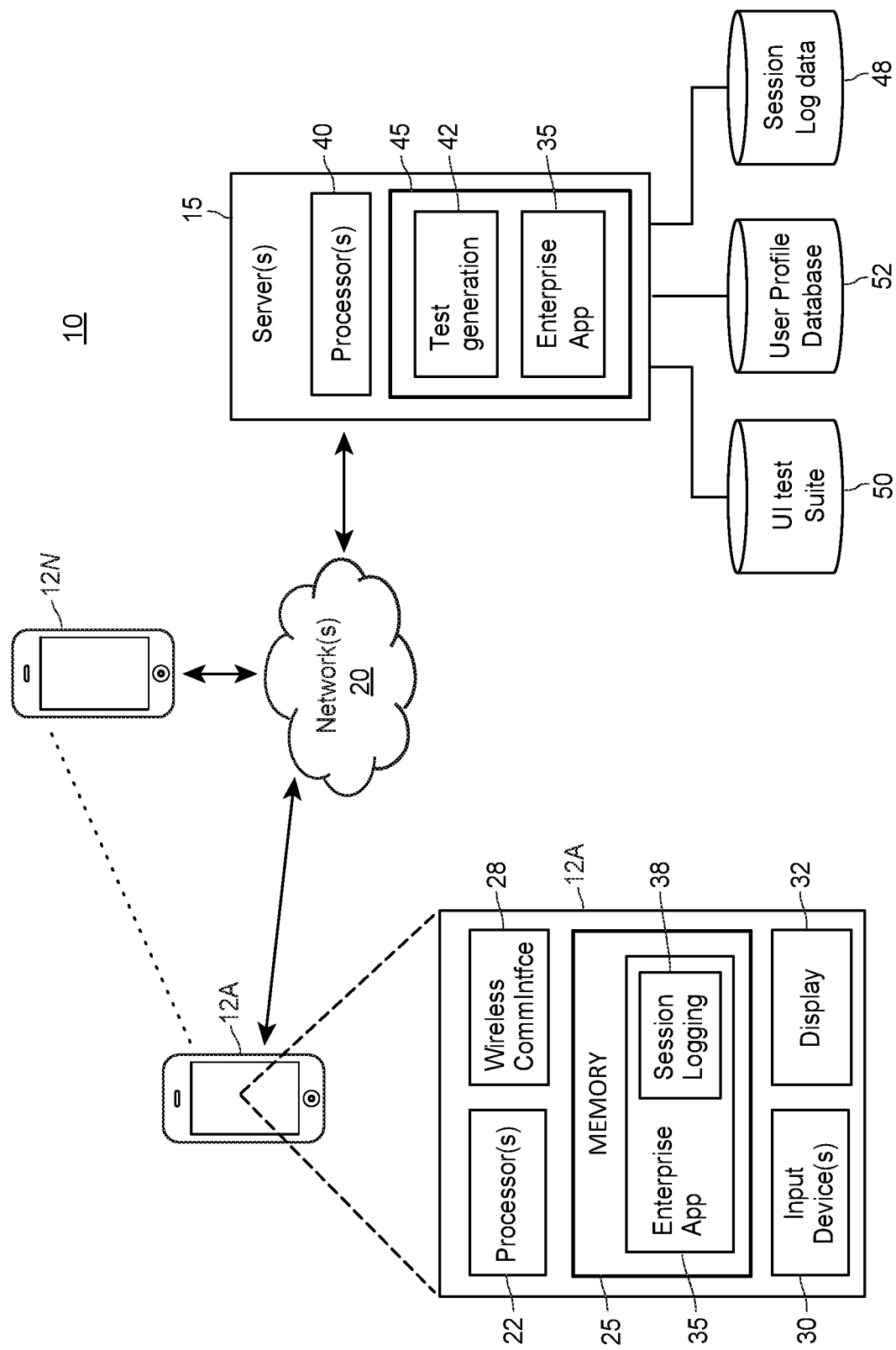
FIG. 1 depicts an example system in which techniques for automatically generating user interface test cases for enterprise applications may be implemented, according to one embodiment.

The embodiments described herein relate to, inter alia, techniques for automatically generating user interface tests or test cases for enterprise-specific mobile applications by utilizing crowd-sourced data. Generally speaking, one or more servers that are associated with (e.g., owned/maintained by) an enterprise may download respective instances of a mobile application of the enterprise to each of a plurality of mobile devices. The enterprise's mobile application may include a session logging unit that captures data indicative of and related to user actions during each session of the instance of the enterprise mobile application executing on a respective mobile device in the field. As is understood by one of ordinary skill in the art, a "session" is a basic unit of measurement of user engagement with an application, and generally refers to the period of time that a user has the application open in the foreground, and during which a user action or event occurs, is sent, or "is fired" prior to a pre-defined length of time, e.g., 5 minutes. Events that occur within the pre-defined length of time of each other are counted towards a current session.

The data that is captured during each user session is referred to herein as a "session log," and may include indications of a sequence of user actions or user events (e.g., an ordered set of user actions or user events) that occur during the session, indications of each time interval that elapses between each user action/event, and optionally other information. Session logs including such session data are transmitted to the enterprise servers and stored for analysis. Accordingly, over the course of millions of enterprise mobile application sessions occurring over thousands or even millions of mobile devices, it is possible to collect and analyze billions (or even greater numbers) of user actions/events, their sequencing, and the times elapsed between their respective firings.

At the enterprise servers, the stored session data is mined to discover or identify sequences or sets of ordered user events that occur over and over again, e.g., across multiple sessions and/or multiple mobile devices. When the number and/or rate of occurrences of a particular sequence of user actions/events is greater than a threshold, a test case for the particular sequence of user actions/events is automatically generated by the servers and is automatically added to a suite of test cases for the user interface of the enterprise application. The threshold may be adjusted based on various conditions, such as the total number of session logs that are being mined, a total number of test cases included in the suite of test cases, a particular attribute or condition associated with the session log and/or user (e.g., geographic location, demographics and/or other attributes of the user, operating system executing at mobile device, etc.), a comparison of a number and/or a rate of occurrences of a particular sequence of user actions/events with a comparison of the number and/or the rate of occurrences of another sequence of user action/events, and/or other criteria.

In some embodiments, only portions of the stored session data that share one or more characteristics may be mined to discover or identify sets of ordered user events that are common across multiple sessions and/or multiple mobile devices for the shared characteristics. For example, the stored session data may be filtered, for mining purposes, based on geographic location, user demographic, and/or other criteria, and the filtered session data may be mined to discover identify sets of ordered user events that are common for the criteria on which the session data was filtered. As such, the test cases that are generated are not only accurate with respect to actual user actions, but are also relevant for specific situations, geographical areas, user characteristics, mobile device characteristics, and/or other limiting criteria.

By using the techniques disclosed herein, automatically generated test cases are more accurate in their representation of (and in some cases, are identical to) sequences of actions that are actually performed by actual users of the enterprise application (e.g., that are actually performed in the field or real-world). Significantly, test cases that are automatically generated by the techniques described herein are more accurate than test cases that are synthetically generated by machine learning models. Such synthetic, model-generated test cases, by their nature, include some degree of uncertainty even though they are generated based on actual user data, as such model-based test cases are statistically generated and therefore are completely new (e.g., "net new") test cases. In a sense, and at least in part due to the crowd-sourced session log data, the automatic test generation techniques disclosed herein are more deterministic than model-based test generation techniques and are subject to less uncertainty, if any.

Additionally, the accuracy of the test cases that are automatically generated by the techniques disclosed herein result in a more robust and higher-quality user interface test suite which, when applied to test versions of the enterprise application, is more likely to detect issues that would actually occur (and not just merely have a statistical chance of occurring) in the field or real-world. Accordingly, downtime and broken features of the enterprise application may be reduced, while the quality of the enterprise application may be significantly increased.

Further, the techniques disclosed herein allow a user interface test suite to be adjusted to include the most relevant test cases, e.g., in accordance with parameters specified by the enterprise. For example, the enterprise may desire to limit, e.g., for resource reasons, the UI test suite to a maximum number of test cases $N_{max}$. As such, the particular test cases that are to be included in the UI test suite may be adjusted at least partially based on comparisons of their relative number and/or rate of occurrences within the session data log, so that the most relevant test cases are included. (Of course, the particular test cases that are to be included in the UI test suite may be adjusted based on other criteria as well, such as type of test, particular feature that is to be tested, and the like.)

Still further, by using the techniques disclosed herein, the resources that are required to build test cases and a robust test suite (e.g., time, manual effort, cost, etc.) for the user interface of an enterprise's mobile application are significantly reduced.

II. Example Environment for Automatically Generating User Interface Test Cases for Enterprise Applications FIG. 1 depicts an example environment 10 in which techniques for automatically generating user interface (UI) test cases for enterprise applications may be implemented, according to one embodiment. As seen in FIG. 1, the example environment 10 includes a plurality of mobile devices 12A-12N and a server 15. Mobile devices 12A-12N are communicatively coupled to server 15 via a network 20, and each mobile device 12A-12N may be remote from server 15. Network 20 may be a single communication network, or may include multiple communication networks of one or more types (e.g., one or more wired and/or wireless local area networks (LANs), and/or one or more wired and/or wireless wide area networks (WANs) such as the Internet, public networks, private networks, etc.). It is understood that many different mobile devices (of different users), each similar to mobile device 12A, may be in remote communication with server 15. For example, hundreds, thousands, millions, or greater numbers of mobile devices (e.g., N>100, N>1000, N>100,000, N>1,000,000, etc.) similar to mobile device 12A may in remote communication with server 15.

Each mobile device 12A-12N is associated with (e.g., in the possession of, configured to provide secure access to, etc.) a respective, different user. The users may be customers, or potential customers, of an enterprise associated with server 15, for example. Each of mobile devices 12A-12N may be a different type of device (e.g., mobile device 12A may be a smartphone while mobile device 12B may be a smart watch, etc.), or the same type of device.

Generally, mobile device 12A may be a personal computing device of a user, such as a smartphone, smart device, tablet, laptop, smart glasses, or any other suitable device or combination of devices (e.g., a smart watch plus a smartphone) with wireless communication capability. In the embodiment of FIG. 1, mobile device 12A includes a processor 22, a memory 25, a wireless communication interface 28, one or more input devices 30, and a display 32. Processor 22 may include any suitable number of processors and/or processor types (e.g., one or more central processing units (CPUs)); however, processor 22 is referred to herein using the singular tense for ease of reading (and not limitation) purposes. Processor 22 may include one or more CPUs and one or more graphics processing units (GPUs), for example. Generally, processor 22 is configured to execute software or computer-executable instructions stored in memory 25. For example, processor 22 may be configured to execute an instance of a mobile application 35 that is provided by the enterprise associated with server 15 and that is stored on memory 25, where the instance of the mobile application 35 comprises a particular set of computer-executable instructions. The enterprise mobile application 35 may be downloaded from server 15 to mobile device 12A, for example, and includes session logging unit 38. Generally speaking, and as will be described in more detail, session logging unit 38 is configured to capture records or logs of ordered user actions that occurred during a session of the enterprise application 35 executing at mobile device 12A.

Memory 25 may also include one or more persistent memories configured to store data that is used and/or generated by enterprise application 35. Generally, memory 25 may include one or more persistent memories (e.g., a hard drive and/or solid state memory) and is referred to herein using the singular tense for ease of reading (and not limitation) purposes.

Wireless communication interface 28 includes hardware, firmware and/or software that is generally configured to communicate with other devices (including at least other mobile devices) using a wireless communication protocol. For example, wireless communication interface 28 may be configured to transmit and receive data using a Bluetooth protocol, a WiFi (IEEE 802.11 standard) protocol, a near-field communication (NFC) protocol, a cellular (e.g., GSM, CDMA, LTE, WiMAX, etc.) protocol, and/or other suitable wireless communication protocols. Typically, wireless communication interface 28 includes one or more transceivers.

Input device(s) 30 includes one or more components that enable mobile device 12A to accept inputs from the user. For example, input device(s) 30 may include an integrated keyboard and/or a microphone, with associated software and/or firmware. Display 32 may use any suitable display technology (e.g., LED, OLED, LCD, etc.), and in some embodiments may be integrated with input device(s) 30 as a touchscreen display. Generally, input device(s) 30 and display 32 combine to enable a user to interact with graphical user interfaces (GUIs) provided by mobile device 12A.

For ease of illustration, FIG. 1 does not depict the components of mobile device 12N. However, for the example embodiment of FIG. 1, mobile device 12N includes each of the components shown in FIG. 1 for mobile device 12A. It is understood that, in some other embodiments, mobile device 12N does not have all of the components shown within mobile device 12A in FIG. 1.

Server 15 may be an individual server, a group (e.g., cluster or cloud) of multiple servers, or another suitable type of computing device or system, however, server 15 is referred to in the singular tense herein for ease of reading (and not limitation) purposes. Server 15 includes one or more processors 40. Processor 40 may include any suitable number of processors and/or processor types (e.g., one or more central processing units (CPUs)); however, processor 40 is referred to herein using the singular tense for ease of reading (and not limitation) purposes. Generally, processor 40 is configured to execute software or computer-executable instructions stored in one or more persistent memories 45 of server 15, where the one or more persistent memories 45 may include hard drives, solid state memories, data banks, cloud data storage, etc.

The software instructions executed by processor 22 may include the instructions of a test generation unit 42. Generally, and as will be described in more detail below, test generation unit 42 may be configured to automatically generate new and/or updated test cases for testing the user interface of enterprise application 35 based on session log data 48. Session log data 48 may be obtained by server 15 from the multiple instances of enterprise application 35 executing at multiple mobile devices 12A-12N, and the received session log data 48 may be stored in one or more local, persistent memories 45 of server 15, may be stored remotely from server 15 (e.g., as illustrated in FIG. 1), and in some embodiments may include a number of separate databases (e.g., some stored locally at server 15, and others stored remotely at one or more persistent memories that are located remotely from server 15).

Additionally, test generation unit 42 may be configured to automatically add the newly generated test cases to user interface (UI) test suite 50, and/or to update existing test cases of UI test suite 50. UI test suite 50 includes a multiplicity of different test cases that may be applied to the user interface of enterprise application 35. UI test suite 50 may be stored in one or more local, persistent memories 45 of server 15, may be stored remotely from server 15 (e.g., as illustrated in FIG. 1), and in some embodiments may include a number of separate databases (e.g., some stored locally at server 15, and others stored remotely at one or more persistent memories that are located remotely from server 15).

Server 15 may be associated with (e.g., owned/maintained by) an enterprise that sells commercial, retail, medical, financial, etc., products and/or services. In one embodiment, server 15 is associated with a pharmacy, and enterprise application 35 is an application that, among other things, enables customers to refill prescriptions, browse and/or purchase products, schedule appointments or consultations, find physical retail locations, etc. that are associated with the enterprise. Enterprise application 35 may be stored in the persistent memories 45 of server 15, for example, and instances of the enterprise application 35 may be respectively downloaded from server 15 into each of mobile devices 12A-12N and other mobile devices. Each instance of enterprise application 35 executing at a respective mobile device may be in communication with server 15, e.g., via mobile device communication interface 28 and network 20.

In some implementations, each instance of enterprise application 35 executing at a respective mobile device is associated with a particular user profile associated with the enterprise. A user profile may include any type of information associated with a user, such as a user's name, address, demographic information (age, gender, height, etc.), email address, phone number, financial account data, pharmacy records, purchase history, browsing history, and the like. User profiles are collectively stored at user profile database 52, which may be implemented using one or more local, persistent memories of server 15, one or more persistent memories that are remotely located from the server 15 (e.g., as illustrated in FIG. 1), and in some embodiments may include a number of separate databases (e.g., some stored locally at server 15, and others stored remotely at one or more persistent memories that are located remotely from server 15). Typically, only profiles of users who have expressly agreed to share their personal data with the enterprise (and in some cases, only for particular purposes) are accessible to software instructions and applications executing at server 15, such as test generation unit 42 and other instructions and applications (not shown).

Of course, in some embodiments, the environment 10 includes additional components not shown in FIG. 1.

Figure 2:
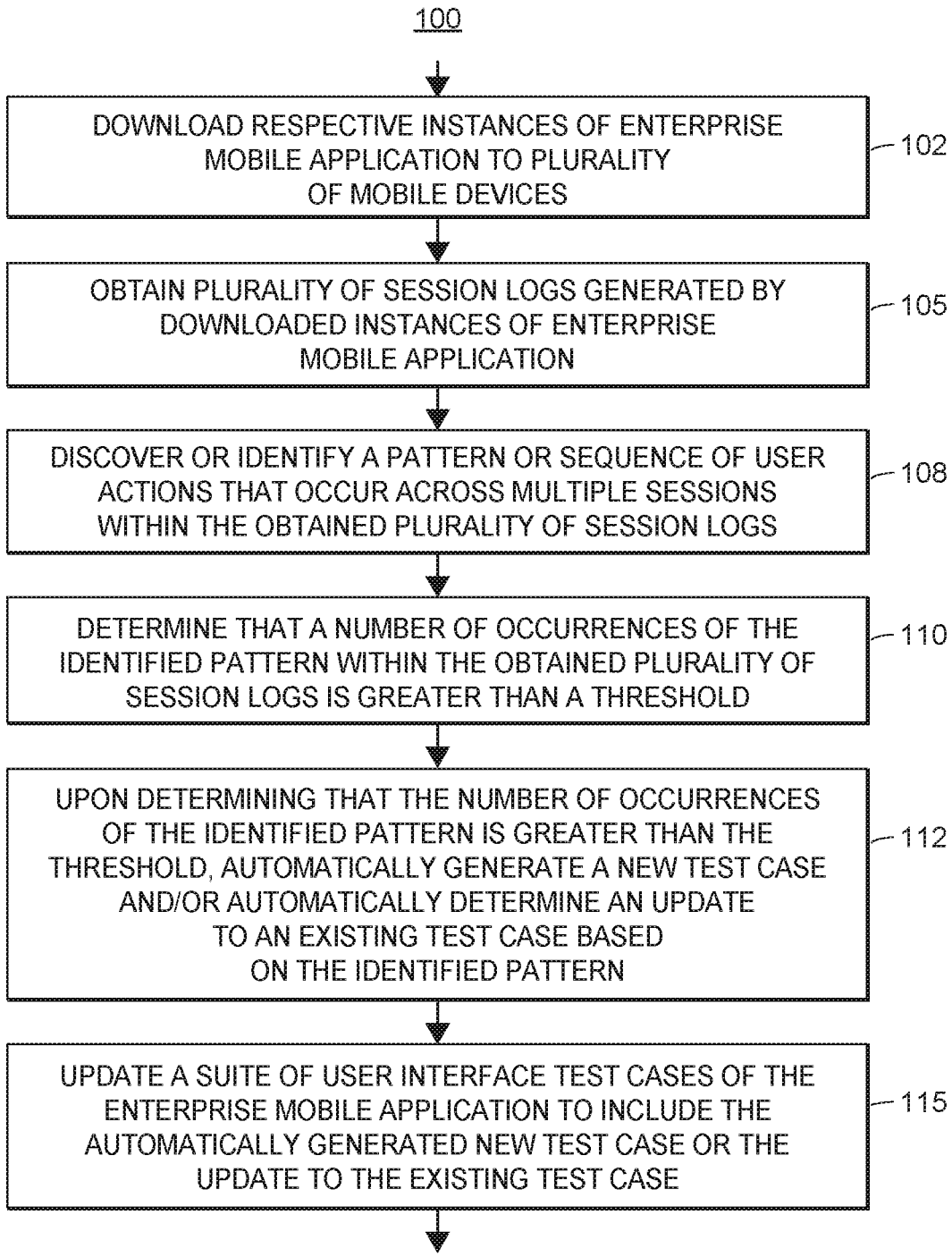
FIG. 2 is a flow diagram of an example method of automatically generating user interface tests for an enterprise mobile application, according to one embodiment, e.g., by utilizing crowd-sourced data.

III. Example Methods and Algorithms for Automatically Generating User Interface Tests for Enterprise Applications FIG. 2 is a flow diagram of an example method 100 of automatically generating user interface tests, e.g., by utilizing crowd-sourced data. The method 100 may be at least partially implemented by a computer system, such as server 15 of FIG. 1. For example, computer-executable instructions 42 stored on one or more memories 45 of server 15 may be executed by processor 40 to cause server 15 to perform at least a portion of method 100. The method 100 is described below with simultaneous reference to FIG. 1 for clarity of discussion and not limitation purposes, as embodiments of the method 100 may be implemented by using systems and/or components other than those shown in FIG. 1.

At a block 102, the method 100 may include downloading respective instances of a mobile application of an enterprise to a plurality of mobile devices. For example, one or more servers 15 of the enterprise may download respective instances of the enterprise mobile application 35 to multiple mobile devices 12A-12N. At each mobile device 12A-12N, and particularly referring to mobile 12A for ease of illustration, the instance of the enterprise application 35 may be received via wireless communication interface 28 or via another communication interface. The instance of the enterprise application 35 may be stored in memory 38 of the mobile device 12A, so that computer-executable instructions of which the application 35 comprises may be executed by processor 22 of the mobile device 12A.

The instance of the enterprise mobile application 35 stored and executed at mobile device 12A includes a session logger 38, which may be implemented by a specific set of computer-executable instructions of enterprise mobile application 35. For example, session logger 38 may be implemented using a collection of methods and logics such as an SDK (Software Development Kit); however, other implementations are possible. In some embodiments, the instance of the enterprise mobile application 35 is associated with a particular user, whose user profile may be stored at the instance of enterprise mobile application 35 and/or at server 15. For example, a user may create an electronic account associated with the enterprise, and may provide different types of data that are stored in a user profile associated with the created electronic account. Additionally, data related to the user that is obtained by the enterprise during encounters of the user with the enterprise (e.g., electronically, by telephone, or in-person) may be stored in the user profile. Examples of data which may be stored in the user profile include name, address, demographic information (age, gender, height, etc.), email address, phone number, financial account data, pharmacy records, purchase history, browsing history, etc. The user profile may be stored at server 15, and/or at least a portion of the information that is stored in the user profile may be stored at mobile device 12A so that it is locally available to the instance of enterprise mobile application 35 executing on mobile device 12A.

During execution of the instance of enterprise mobile application 35 at mobile device 12A, session logger 38 records a corresponding session log for each session of the enterprise mobile application 35, e.g., in memory 25 or some other memory or cache at mobile device 12A. Each session log indicates, for its corresponding session, the particular sequence of user actions that have been taken and/or user events that have occurred at user interface of the enterprise application 35 (e.g., via a user interacting with the enterprise application 35 via input devices 30 and/or display 32) and respective time intervals elapsing between each user action/event of the sequence. Such a sequence of user actions/events and respective time intervals elapsing therebetween may be recorded or logged by utilizing any suitable type of indications, such as by logging indications of respective identities of each user action/event and its respective timestamps, or by utilizing other logging techniques. In some embodiments, an indication of a user profile associated with the instance of the enterprise mobile application 35 is stored in or otherwise associated with each session log. Session logs that have been generated by session logger 38 of mobile device 12A are transmitted by the instance of enterprise application 35 to server 15, e.g., via wireless communication interface 28 or some other communication interface of mobile device 12A.

At a block 105, the method 100 may include obtaining a plurality of session logs generated by the plurality of instances of the enterprise mobile application executing at the plurality of mobile devices, and storing the obtained session logs on one or more non-transitory data storage devices. For example, server 15 may obtain the session logs generated by the instances of enterprise mobile application 35 executing at mobile devices 12A-12N, and may store the obtained session logs in session log data 48. Generally speaking, session log data 48 is crowd-sourced data, as session log data 48 has been obtained from large numbers (e.g., thousands, millions, tens of millions, or greater numbers) of enterprise mobile application sessions occurring at instances of enterprise mobile application 35 executing on large numbers (e.g., thousands, millions, or greater numbers) of mobile devices 12A-12N.

At a block 108, the method 100 may include discovering or identifying a particular pattern or sequence of user actions that has occurred in more than one session log. In an embodiment, server 15 may mine session log data 48 to thereby discover one or more different patterns of user actions, where each pattern is a different sequence of user actions that has occurred at the user interface of enterprise application 35 across multiple sessions and multiple mobile devices. That is, each identified pattern is a respective ordered set of user actions that has been performed repeatedly by users of enterprise mobile application 35.

In an embodiment, mining session log data to thereby discover or identify a particular pattern of a sequence of user actions (block 108) includes selecting a subset of session log data 48 to mine. Selecting the subset of session log data 48 for mining may include filtering session log data 48 (and/or by using some other selecting action) based on one or more attributes, criteria, or characteristics related to the users of the respective mobile applications 35, e.g., a geographic location, a demographic characteristic, a length of time a user has been a customer of the enterprise, a type of user mobile device and/or type of operating system executing at the mobile device, a duration of a session, etc. Such attributes may be indicated by user profiles, instances of enterprise application 35, and/or by the mobile devices themselves, for example. Selecting the subset of session log data 48 for mining may additionally or alternatively include filtering (or otherwise selecting) session log data 48 based on one or more criteria or characteristics related to the instance of enterprise mobile application 35, such as the version or release of the application 35, what patches have been applied, etc.

Patterns of different complexities may be discovered or identified. For example, as discussed above, a pattern may include a sequence of user actions or an ordered set of user actions. An example pattern that has additional complexity may include both the sequence of user actions and durations of one or more of time intervals that have elapsed between at least some of the user actions included in the sequence. A reoccurrence of this example pattern within the session log data may be identified when, for an occurrence of the sequence of user actions within the session log data, each of the one or more elapsed time intervals falls within a respective range of duration, for example. The ranges of durations may be adjustable, if desired.

Another example of a pattern which may be discovered or identified may be a higher-level pattern of patterns. That is, a higher-level pattern may be an ordered set of multiple sequences of user actions. For example, a first sequence of user actions may be identified as a first pattern, and a second sequence of user actions may be identified as a second pattern. A third, higher-level pattern may be identified in which the second pattern occurs immediately, or within some time interval, after the occurrence of the first pattern, for example.

A pattern may be identified for a particular set of attributes or characteristics associated with users and/or their mobile devices. For example, a particular pattern may be identified for users of a particular age group or other demographic, for users whose mobile devices are running a particular version of an operating system, for users whose profiles indicate a certain geographical area, etc. Additionally or alternatively, a pattern may be identified for a particular set of attributes or characteristics of the enterprise mobile application. For example, a particular pattern may be identified for a particular version of the enterprise mobile application, for a particular version of the enterprise mobile application onto which particular patches have been applied, etc.

At any rate, at a block 110, the method 100 may include determining a number and/or a rate of occurrences of the identified pattern within the mined set of session log data (e.g., the entirety of session log data 48, or a selected subset thereof). In an embodiment, the method 100 may include determining that the number of occurrences of the identified pattern is greater than a threshold, e.g., 10 occurrences, 20 occurrences, 30 occurrences, 75 occurrences, etc. For example, server 15 may count the number of occurrences of identified pattern within the set of session log data from which it was discovered.

In some embodiments, the threshold may be based on one or more characteristics of session log data 48 and/or of UI test Suite 50. For example, the threshold may be based upon a current total number of session logs included in session log data 48 or in a subset thereof from which the pattern was identified, and/or a total number of test cases included in the entire suite of UI test cases or subset thereof. Accordingly, in these embodiments, the threshold may be a threshold corresponding to a rate of occurrence of an identified pattern within session log data 48 or subset thereof.

In some embodiments, the threshold may be a comparative threshold, e.g., a threshold that is based on a comparison of the number and/or rate of occurrences of the identified pattern with the number and/or rate of occurrences of another identified pattern. Still, in some embodiments, the threshold may be based on a total number of test cases of a particular type or having particular characteristics that are included in the suite of test cases or subset thereof. Types of test cases and/or other characteristics of test cases may be delineated or defined by the enterprise and may pertain to, for example, tests of timing or speed, tests of request/response accuracy, tests of content, tests of visual display, tests that utilize one or more specified user controls, tests pertaining to different navigation panes of the mobile application, etc.

Generally speaking, at the block 110, a threshold may be predetermined, and may be adjustable, e.g., manually and/or automatically.

Upon determining that the number and/or the rate of occurrences of the identified pattern is greater than the threshold (block 110), the method 100 may include automatically generating a new test case and/or automatically determining an update to an existing test case based on the particular pattern (block 112). For example, the automatically generated new and/or update to the existing test case may include at least a subset of the sequence of user actions/events of the pattern, and may optionally include defined time intervals between each user action/event, which may be based upon the elapsed time intervals occurring in the pattern.

At a block 115, the method may include automatically updating the suite of user interface test cases of the enterprise mobile application to include the new test case or updated test case. For example, if a new test case was automatically generated at the block 112, the method 100 may include automatically adding the new test case to UI test suite 50. If an update to an existing test case was automatically determined at the block 112, the block 115 may include updating the existing test case within UI test suite 50, or may include substituting a new test case that corresponds to the update for the existing test case within the test suite 50.

In some embodiments (not shown in FIG. 2), the method 100 may further include obtaining additional session logs that have been generated by the plurality of instances of the enterprise application executing at the plurality of mobile devices and/or by other instances of the enterprise application executing at other mobile devices. The additional session logs may be added to the session log data 48 to thereby generate an updated set of session log data 48, and the updated set of session log data 48 (or subset thereof) may be mined to thereby discover an additional, new pattern and/or a change to a previously identified pattern. The blocks 110-115 of the method 100 may be repeated for the additional, new pattern and/or for the change to the previously identified pattern.

Figure 3:
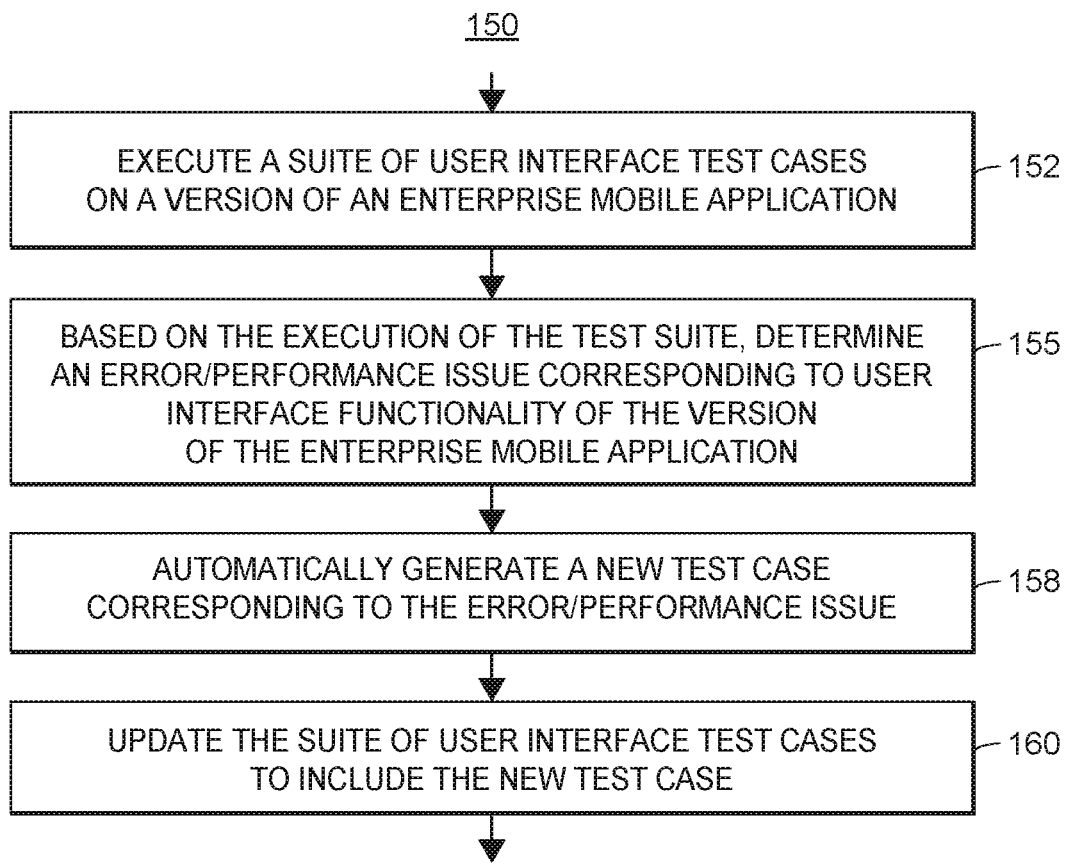
FIG. 3 is a flow diagram of an example method of automatically generating user interface tests for an enterprise mobile application, according to one embodiment.

FIG. 3 is a flow diagram of an example method 150 of automatically generating user interface test cases for an enterprise mobile application. The method 150 may be at least partially implemented by a computer system, such as server 15 of FIG. 1. In an embodiment, computer-executable instructions 42 stored on one or more memories 45 of server 15 may be executed by processor 40 to cause server 15 to perform at least a portion of method 150. In some embodiments, the method 150 may be included in or performed in conjunction with the method 100. For example, the method 150 may be performed after completion of block 115 of the method 100. The method 150 is described below with simultaneous reference to FIG. 1 for clarity of discussion and not limitation purposes, as embodiments of the method 150 may be implemented by using systems and/or components other than those shown in FIG. 1.

At a block 152, the method 150 may include executing or performing a suite of user interface test cases on a version of an enterprise mobile application that is to be tested, e.g., on a "test version" of the enterprise mobile application. For example, one or more test cases included in UI test suite 50 may be executed or performed on a test version of enterprise mobile application 35 executing on a physical mobile device or virtual machine. In an embodiment, the set of test cases that is executed or performed on the test version may be automatically or manually selected based on one or more criteria, such as type of test, characteristic of user, feature of user interface, etc. In some embodiments, the entirety of UI test suite 50 is executed or performed on the test version of enterprise mobile application 35.

Initiating the execution or performance of UI test cases (block 152) may be performed automatically, e.g., periodically, at predetermined times, and/or when triggered by another set of computer-executable instructions that are stored on memories 45 and that are being executed by processor 40 of server 15. For example, when one particular type of tests are being run on the test version of the enterprise mobile application 35 and a specific behavior occurs, based on the occurrence of the specific behavior, the presently executing instructions may trigger a different type of test to be automatically executed on the test version of the enterprise mobile application 35. Additionally or alternatively, initiating the execution or performance of UI test cases (block 152) may be performed manually, e.g., based on a user request received by server 15.

At a block 155, the method 150 may include determining, based on execution of the test suite, an error and/or a sub-optimal performance issue that corresponds to user interface functionality of the version of the enterprise mobile application. For example, upon running a particular test for a newly added feature, the test results may show that the retrieval of requested data within the feature was too slow (e.g., the elapsed time from the user requesting the data to the data being displayed was greater than a maximum length of time), incorrect data was returned and displayed on the user interface, correct data was returned and incorrectly displayed on the user interface, the user is no longer able to navigate to some portion of the enterprise application, etc.

At a block 158, the method 150 may include automatically generating one or more new test cases corresponding to the detected error/sub-optimal performance issue. For example, the one or more new test cases may be directed to a particular sequence of user actions and/or events (which may be user-initiated events, enterprise application-initiated events, and/or server-initiated events) that occurred prior to the occurrence of the error/sub-optimal performance issue. Additionally or alternatively, the one or more new test cases may be directed to lengths of time intervals elapsing between the respective occurrence of each user action/event, a particular sequence of states in which the enterprise mobile application was prior to the occurrence of the error/sub-optimal performance issue, variations thereof (e.g., to thereby test if such an error/sub-optimal performance issue also occurs for other sequences of user actions/events, elapsed time intervals, and/or mobile application states), etc.

At a block 160, the method 150 may include automatically updating the suite of user interface test cases to include the one or more new test cases. For example, new test cases may be automatically added to UI test suite 50, and/or existing test cases within UI test suite 50 may be modified to reflect the one or more new test cases.

In some embodiments, the method 150 may return to the block 152, e.g., so that the updated suite of user interface test cases may be automatically executed or performed on the test version of enterprise mobile application 35.

IV. Additional Considerations

The following considerations also apply to the foregoing discussion.

With respect to the foregoing, in some situations, a user of an enterprise application may opt-in to allowing the enterprise application to capture and record their interactions with the enterprise application. After the user has provided their affirmative consent, an instance of the enterprise application corresponding to the user may log or record user actions and user events occurring at the user interface of the instance of the enterprise application.

The methods discussed herein may be computer-implemented methods, and may include additional, less, or alternate actions, including those discussed elsewhere herein. The methods may be implemented via one or more local or remote processors, transceivers, and/or servers (such as processors and/or transceivers of mobile devices and/or associated with smart remote servers), and/or via computer-executable instructions stored on tangible, non-transitory computer-readable media or medium.

Additionally, the computer systems discussed herein may include additional, less, or alternate functionality, including that discussed elsewhere herein. The computer systems discussed herein may include or be implemented via computer-executable instructions stored on tangible, non-transitory computer-readable media or medium.

Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

Upon reading this disclosure, those of skill in the art will appreciate still additional alternative structural and functional designs for prompting word-of-mouth interactions using proximity-based messaging, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of automatically generating user interface tests, the method comprising:
   downloading, from one or more servers, a respective instance of a mobile application to each of a plurality of mobile devices, the mobile application configured to capture a respective session log for each user session of the mobile application, and the respective session log including one or more indications of ordered user actions that occurred during the each user session and time intervals elapsing between each of the ordered user actions;
   obtaining, by the one or more servers, a plurality of session logs generated by the plurality of instances of the mobile application executing at the plurality of mobile devices, and storing the plurality of session logs in one or more non-transitory data storage devices accessible to the one or more servers;
   discovering, by the one or more servers by mining the plurality of session logs, a particular pattern of a sequence of user actions and respective time intervals elapsing therebetween, the particular pattern included in more than one session log;
   determining, by the one or more servers, that a number and/or a rate of occurrences of the particular pattern within the plurality of session logs is greater than a threshold;
   based upon the determination, automatically generating, by the one or more servers, a new test case based on the particular pattern; and
   automatically adding the new test case to a suite of test cases that is used to test user interface functionality of the mobile application.

2. The method of claim 1, further comprising determining, by the one or more servers, that a particular occurrence of the sequence of user actions and the respective time intervals elapsing therebetween is included in the particular pattern when each of the respective time intervals of the particular occurrence of the sequence has a respective duration included in a respective range of durations.

3. The method of claim 1, wherein the respective session log indicates one or more user attributes of a user profile corresponding to the each user session, and wherein discovering the particular pattern comprises discovering the particular pattern of the sequence of user actions for a particular set of user attributes.

4. The method of claim 1, wherein the sequence of user actions is a first sequence of user actions, and wherein discovering the particular pattern comprises discovering an ordered set of multiple sequences of user actions, the multiple sequences of user actions including the first sequence of user actions.

5. The method of claim 1, wherein mining the plurality of session logs consists of mining a subset of the plurality of session logs, and wherein discovering the particular pattern that is included in more than one session log comprises discovering the particular pattern within the subset of the plurality of session logs.

6. The method of claim 1,
further comprising obtaining, by the one or more servers, additional session logs generated by the plurality of instances of the mobile application executing at the plurality of mobile devices;
storing the additional session logs in the one or more non-transitory data storage devices, thereby generating an updated plurality of stored session logs; and
discovering, by mining the updated plurality of stored session logs, at least one of: a change to the particular pattern or an additional pattern.

7. The method of claim 1, further comprising adjusting, via the one or more servers, the threshold.

8. The method of claim 7, wherein adjusting the threshold comprises adjusting the threshold based on at least one of: a current total number of session logs stored in the one or more non-transitory data storage devices, a comparison of the number of occurrences of the particular pattern within the plurality of session logs with a number of occurrences of another pattern discovered within the plurality of session logs, or a current total number of test cases included in the suite of test cases.

9. The method of claim 1, further comprising automatically executing, by the one or more servers, the suite of test cases that include the new test case on a test version of the mobile application.

10. The method of claim 9, wherein the new test case is a first new test case, and the method further comprises automatically generating a second new test case corresponding to an error and/or performance issue that occurs during the automatic execution or another execution of the suite of test cases, and adding the second new test case to the suite of test cases.

11. One or more servers, comprising:
one or more processors; and
one or more non-transitory memories storing instructions that, when executed by the one or more processors, cause the one or more servers to:
download a respective instance of a mobile application to each of a plurality of mobile devices, the mobile application configured to capture a respective session log for each user session of the mobile application, and the respective session log including one or more indications of ordered user actions that occurred during the each user session and time intervals elapsing between each of the ordered user actions;
obtain a plurality of session logs generated by the plurality of instances of the mobile application executing at the plurality of mobile devices, and store the plurality of the session logs at the one or more servers;
discover, by mining the plurality of session logs, a particular pattern of a sequence of user actions and respective time intervals elapsing therebetween, the particular pattern included in more than one session log;
determine that a number and/or a rate of occurrences of the particular pattern within the plurality of session logs is greater than a threshold;
based upon the determination, automatically generate a new test case including the particular pattern; and
automatically add the new test case to a suite of test cases that is used to test user interface functionality of the mobile application.

12. The one or more servers of claim 11, wherein the instructions, when executed by the one or more processors, further cause the one or more servers to determine that a particular occurrence of the sequence of user actions and the respective time intervals elapsing therebetween is included in the particular pattern when each of the respective time intervals of the particular occurrence of the sequence has a respective duration included in a respective range of durations.

13. The one or more servers of claim 11, wherein the respective session log indicates one or more user attributes of a user profile corresponding to the each user session, and wherein the particular pattern includes the sequence of user actions for a particular set of user attributes.

14. The one or more servers of claim 11, wherein the sequence of user actions is a first sequence of user actions, the particular pattern comprises an ordered set of multiple sequences of user actions, and the multiple sequences of user actions includes the first sequence of user actions.

15. The one or more servers of claim 11, wherein the instructions, when executed by the one or more processors, further cause the one or more servers to:
obtain additional session logs generated by the plurality of instances of the mobile application executing at the plurality of mobile devices;
add the additional session logs to the plurality of stored session logs to generate an updated plurality of stored session logs; and
discover, by mining the updated plurality of stored session logs, at least one of: a change to the particular pattern or an additional particular pattern.

16. The one or more servers of claim 11, wherein the threshold corresponds to at least one of: a total number of session logs included in a mined set of session logs of the plurality of session logs, a comparison of the number and/or the rate of occurrences of the particular pattern within the mined set of session logs with a number and/or a rate of occurrences of another pattern within the mined set of session logs, a type of test case, a characteristic of test cases, a characteristic of the mined set of session logs, or a total number of test cases included in the suite of test cases or a subset thereof.

17. The one or more servers of claim 11, wherein the instructions, when executed by the one or more processors, further cause the one or more servers to automatically execute the suite of test cases that include the new test case on a test version of the mobile application.

18. The one or more servers of claim 17, wherein the new test case is a first new test case, and the instructions, when executed by the one or more processors, further cause the one or more servers to automatically generate a second new test case corresponding to an error and/or performance issue occurring during the automatic execution of the suite of test cases, and to add the second new test case to the suite of test cases.

* * * * *